Patented June 13, 1950

2,510,945

UNITED STATES PATENT OFFICE 2,510,945

N-CYCLOHEXYL NICOTINAMIDE

Charles O. Badgett, Glenside, and Charles F. Woodward, Abington, Pa., assignors to the United States of America as represented by the Secretary of Agriculture No Drawing. Original application April 24, 1945, Serial No. 590,103. Divided and this application September 3, 1947, Serial No. 772,008

5 Claims. (Cl. 99—11)

(Granted under the act of March 3, 1883, as amended April 30, 1928; 370 O. G. 757)

This application is made under the act of March 3, 1883, as amended by the act of April 30, 1928, and the invention herein described and claimed, if patented, may be manufactured and used by or for the Government of the United States of America for governmental purposes without the payment to us of any royalty thereon.

This is a division of our copending application Serial No. 590,103, filed April 24, 1945, now abandoned.

This invention relates to new compositions of matter comprising derivatives of nicotinamide and nicotinic acid, and more particularly N-cyclohexyl nicotinamide.

Nicotinamide and nicotinic acid are organic compounds of the vitamin B series which are used in medicinals, pharmaceuticals, and food because of their specific action in the prevention of pellagra. However, in the fortification of foods, the use of these compounds is somewhat limited because of their solubility in water. For example, in the fortification of corn grits, white rice, and other food material which is rinsed prior to cooking, much of these compounds is lost in the washing process.

One of the objects of this invention is the provision of a new derivative of nicotinic acid and nicotinamide which will retain the pellagra-preventing properties of nicotinic acid and nicotinamide but which is water-insoluble so as to permit its use in the fortification of foods which require washing or other processing with water without danger of losing appreciable amounts of vitamin.

We have found that N-cyclohexyl nicotinamide not only retains the pellagra-preventing properties of nicotinic acid and nicotinamide but is also effective as an anti-convulsant and anti-spasmodic. It is substantially insoluble in water. However, it is moderately soluble in organic solvents and, therefore, may be used for the preparation of solutions suitable for impregnating or depositing on food products. It is also sufficiently stable to the action of water so that it undergoes little or no hydrolysis during washing processes.

N-cyclohexyl nicotinamide may be prepared as follows: Heat together 81.0 gms. (0.82 mole) cyclohexylamine and 101.0 gms. (0.82 mole) nicotinic acid at 225° to 250° C. for thirty minutes. Cool the reaction mixture and add 500 cc. of chloroform. Filter off and recover the 48 gms. (0.39 mole) of unreacted nicotinic acid. Boil the chloroform solution of cyclohexylnicotinamide with Norit and filter. Add petroleum ether to the chloroform solution until precipitation of the amide starts. Cool the solution and filter off the cyclohexylnicotinamide. A yield of 68.6 per cent or 60.4 gms. of the desired product is obtained based on the nicotinic acid consumed in the reaction. The melting point is 140.0°–140.4° C. after one recrystallization from chloroform-petroleum ether.

Analysis, calc'd: C 70.55%, H 7.90%, N 13.72%; Found: C 70.49%, H 7.43%, N 13.39%.

Having thus described our invention, we claim:

1. An anti-pellagra, anti-convulsant, and anti-spasmodic agent comprising N-cyclohexyl nicotinamide.

2. In a method of vitamin fortifying foods which are water-rinsed or water-processed subsequent to fortification, the improvement comprising vitamin fortifying with N-cyclohexyl nicotinamide.

3. A mixture of rice and N-cyclohexyl nicotinamide as vitamin fortifying agent.

4. A mixture of corn grits and N-cyclohexyl nicotinamide as vitamin fortifying agent.

5. A food, vitamin fortified with N-cyclohexyl nicotinamide, the food being one which is water-processed subsequent to fortification and prior to consumption.

CHARLES O. BADGETT.
CHARLES F. WOODWARD.

REFERENCES CITED

The following references are of record in the file of this patent:

UNITED STATES PATENTS

| Number | Name | Date |
| --- | --- | --- |
| 2,166,118 | Bousquet | July 18, 1939 |

OTHER REFERENCES

"Chemistry and Physiology of the Vitamins," by H. R. Rosenberg, Interscience Publishers, Inc., New York (1942), page 239.

Bean and Spies, A Study of the Effects of Nicotinic Acid and Related Pyridene and Pyrazine Compounds on the Temperature of the Skin of Human Beings, published in the American Heart Journal, vol. 20, 1940, pages 62–75.